June 15, 1943. G. F. HOUSTON 2,321,679
INDICATOR VALVE
Filed March 10, 1942
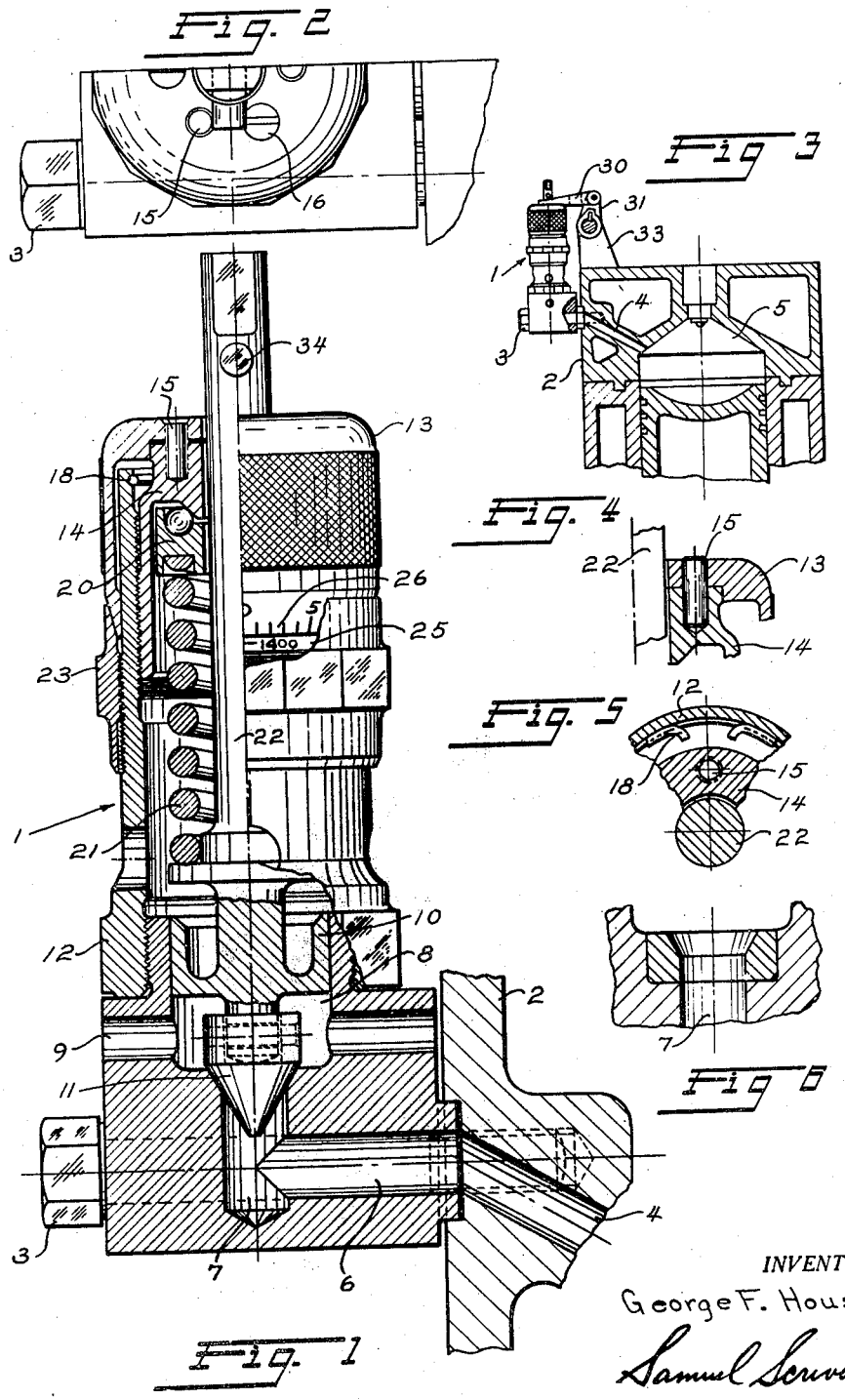
INVENTOR.
George F. Houston
Samuel Scrivener Jr.

Patented June 15, 1943

2,321,679

UNITED STATES PATENT OFFICE 2,321,679

INDICATOR VALVE

George F. Houston, Alexandria, Va.

Application March 10, 1942, Serial No. 434,153

4 Claims. (Cl. 137—53)

This invention relates generally to valves and, more particularly, to valves which provide means for determining the pressure in the combustion chamber of an internal combustion engine and which also provide means for relieving the pressure in the combustion chamber when it reaches a predetermined value.

The principal objects of this invention are to provide, in a valve of the type referred to, means for manually operating the valve to relieve the pressure in the combustion chamber, means for visibly detecting improper operation of the valve, means for locking the valve adjusting members at any desired pressure and to prevent undesired movement thereof, means for preventing hot gases from the combustion chamber from coming into contact with valve controlling members such as the valve spring, and means for improving the bearing between the valve spring and movable parts of the valve casing.

Other objects and features of novelty of the invention will be apparent from the following description and the annexed drawing, it being expressly understood, however, that such description and drawing are only illustrative of the invention and that the invention is not liimted thereby or otherwise than by the appended claims.

Referring to the drawing, in which the same reference numerals refer to corresponding parts, Fig. 1 is a view, partly in section, of the combined pressure indicating and relief valve constituting the invention;

Fig. 2 is a partial plan view of the top of the valve unit;

Fig. 3 is a vertical sectional view of the combustion chamber and other parts of an internal combustion engine, showing attached thereto a valve formed according to this invention;

Fig. 4 is an enlarged view of parts shown in Fig. 1;

Fig. 5 is a sectional view taken on a plane through the sealing ring 18 of Fig. 1, and Fig. 6 is a sectional view showing a modification of the valve seat.

It has been heretofore proposed, and is well-known in the art, to provide a single valve unit which provides means for determining pressure in a combustion chamber and for relieving such pressure at a predetermined value. However, such valves have never been commercially acceptable because of several inherent defects which the present invention overcomes.

As disclosed in the drawing there is provided, by the present invention, a valve unit 1 which is adapted to be connected to the outer wall 2 of an internal combustion engine by any suitable means, such as a bolt 3. A passage 4, extending through the cylinder head of the engine, is connected to the combustion chamber 5, and to passages 6 and 7 in the base of the valve unit 1. Passage 7 opens into a chamber 8 which is connected to atmosphere by vents 9. A piston 10 reciprocally mounted in chamber 8, has connected to its lower face a tapered valve 11 which, in its lowermost position, rests in a tapered valve seat at the upper end of passage 7, thereby preventing the escape of gases from the combustion chamber to the atmosphere. The piston 10 prevents the escape of gases into the upper part of the valve, thereby protecting such parts from the gases. Connected to the base of the valve unit is an upwardly extending, cylindrical sleeve 12. This sleeve is provided near its base with vents which connect the inner, upper portion of the valve unit to atmosphere. A cover 13 is positioned over the upper end of the sleeve 12 and has a depending skirt surrounding the upper part of the sleeve. Threaded to the inner, upper portion of sleeve 12 is an inverted cup-shaped adjusting nut 14 which is fastened to the cover 13 by any suitable means, such as dowels 15 and screws 16 whereby rotation of the cover will effect adjustment of the nut 14 longitudinally of the sleeve. The sleeve 12 is grooved near its upper, inner end in order to receive a retaining ring 18 which is adapted to prevent undue upward movement of the nut 14. Within the inner, upper end of nut 14 is an annular spring seat 20, ball bearings being arranged between these parts to reduce friction. The lower surface of the spring seat 20 engages the upper end of spring 21, the lower end of which is seated on an abutment on the valve stem 22 to which is attached the piston 10 and valve 11. The upper end of stem 22 extends exteriorly of the cover 13 and is provided with a pin 34. The central part of the outer wall of sleeve 12 is threaded to receive a locking nut 23, the upper inner wall of which is tapered in order to fit tightly against the lower tapered wall of the depending skirt of cover 13. After the lock nut 23 has been screwed into locking engagement with the skirt of the cover 13, the relation between the sleeve 12 and the cover and with its associated parts, will remain fixed, notwithstanding any vibration. A series of graduations 25 are arranged vertically on the sleeve 12 and co-operate with a series of circumferentially-arranged graduations 26 on the lower tapered edge of the cover 13, the arrangement being such that one complete rotation of cover 13 will move the lower edge thereof over one main division of the series 25, whereby pressures between the main divisions of the series 25 may be accurately set.

In order to manually lift the valve 11 from its seat, a forked wedge 30 is provided which is formed on one arm of a lever 31 which is pivotally mounted on a bracket 33 attached to the cylinder head. The arms of the forked member 30 are disposed beneath the pin or abutment 34 on the valve stem 22. If it is desired to manually actuate the valve it is only necessary to engage the wedge member 30 with pin 34 and lift the same by means of the lever 31, thereby raising valve 11 from its seat. Improper positioning of the valve may be visibly determined by inspecting the valve stem to see if the protruding part thereof is in proper position.

As is often the case, the valve seat may become worn and permit gases to continually escape from the combustion chamber 5, thereby reducing the efficiency of the engine. In order to prevent this, there is provided by the present invention means for replacing the seat when it becomes worn. Such means, as illustrated by Fig. 6 of the drawing, comprise a small block of metal having a central bore, the upper end of which is tapered to the same degree as the lower surface of the valve 11. In the illustration shown, the metal block is fitted into an opening in the valve base which has the same dimensions as the new block. The bore in the block registers with the passage 7 in the valve base, thereby providing an entirely new valve seat.

In order to operate the valve as a relief valve, pressure of the spring 21 on the valve 11 is set by adjusting the cover 13 on the sleeve 12 until the desired pressure is indicated by the graduations 25 and 26. Lock nut 23 is then operated to lock the cover 13 and its associated parts in place. Pressure in the combustion chamber greater than that indicated by the graduations will lift valve 11 from its seat thereby venting the excess gas to atmosphere through vents 9.

This valve may also be used to determine the amount of pressure present in the combustion chamber of an engine. In order to do this it is first necessary to move lock nut 23 out of engagement with cover 13. The cover is then adjusted until the spring pressure on the valve 11 balances the pressure of the gases coming from the combustion chamber through the passages, which condition may readily be ascertained by listening to the sound of the gases escaping through vents 9. When the pressure exerted on valve 11 by the spring just equals that in the combustion chamber no gas will escape by the valve. The pressure in the combustion chamber will then be indicated by that one of the graduations 25 which is just adjacent the lower edge of the skirt of cover 13 and by the one of the circumferential line of graduations 26 which is just adjacent the vertical line of graduations 25.

While I have illustrated and described one embodiment of my invention, additional embodiments or improvements may occur to those skilled in the art, all of which may be practiced without departing in any way from the spirit or scope of the invention, for the limits of which reference must be had to be appended claims.

I claim:

1. A valve device for relieving and indicating the pressure in the combustion chamber of an internal combustion engine, comprising a base portion having a chamber therein which is open to atmosphere and having a passage therethrough adapted to connect the chamber to a combustion chamber, a valve in said valve chamber which is operable to control said passage, a casing arranged above said base and connected thereto, means within said casing constantly urging said valve to closed position, a piston disposed within the valve chamber and connected to said valve, a cup-shaped closure for the upper end of the casing, registering graduations on said closure and casing for indicating pressure, an inverted cup-shaped nut fastened to the inner part of the closure and being adjustably connected within the casing at the upper part thereof, and an annular seat positioned within the inner upper end of the cup-shaped nut to provide a seat for the means urging the valve to closed position.

2. A valve device for relieving and indicating the pressure in the combustion chamber of an internal combustion engine, comprising a base portion having a chamber therein which is open to atmosphere and having a passage therethrough adapted to connect the chamber to a combustion chamber, a valve in said valve chamber which is operable to control said passage, a casing arranged above said base and connected thereto, means within said casing constantly urging said valve to closed position, a piston disposed within the valve chamber and connected to said valve, a cup-shaped closure for the upper end of the casing, registering graduations on said closure and casing for indicating pressure, an inverted cup-shaped nut fastened to the inner part of the closure and being adjustably connected within the casing at the upper part thereof, an annular seat positioned within the inner upper end of the cup-shaped nut to provide a seat for the means urging the valve to closed position, and means for reducing the friction between the annular seat and the cup-shaped nut.

3. A valve device for relieving and indicating the pressure in the combustion chamber of an internal combustion engine, comprising a base portion having a chamber therein which is open to atmosphere and having a passage therethrough adapted to connect the chamber to a combustion chamber, a valve in said chamber which is operable to control said passage, a casing arranged above said base and connected thereto, means within said casing constantly urging said valve to closed position, a piston disposed within the valve chamber and connected to said valve, a cup-shaped closure for the upper end of the casing, registering graduations on said closure and casing for indicating pressure, an inverted cup-shaped nut fastened to the inner part of the closure and being adjustably connected within the casing at the upper part thereof, an annular seat positioned within the inner upper end of the cup-shaped nut to provide a seat for the means urging the valve to closed position, and ball bearing means between the annular seat and the cup-shaped nut.

4. A valve device for relieving and indicating the pressure in the combustion chamber of an internal combustion engine, comprising a base portion having a chamber therein which is open to atmosphere and having a passage therethrough adapted to connect the chamber to a combustion chamber, a valve in said chamber which is operable to control said passage, a casing arranged above said base and connected thereto, said casing having an annular groove in its upper inner surface, means within said casing constantly urging said valve to closed position, a cup-shaped closure for the upper end of the casing, registering graduations on said closure and casing for indicating pressure, an inverted cup-shaped nut adjustably connected to the inner part of the closure and being adjustably connected within the casing below the annular groove therein, an annular seat positioned within the inner upper end of the cup-shaped nut to provide a seat for the means urging the valve to closed position, and an annular ring provided in a groove in the inner upper part of the casing to limit upward movement of the cup-shaped nut.

GEORGE F. HOUSTON.